United States Patent [19]

Chu et al.

[11] 4,389,357
[45] Jun. 21, 1983

[54] METHOD FOR PREPARING THERMOSETTING RESINS

[75] Inventors: Richard S. Chu, Worthington; Maher L. Mansour, Columbus, both of Ohio

[73] Assignee: Ashland Oil, Inc., Ashland, Ky.

[21] Appl. No.: 277,724

[22] Filed: Jun. 26, 1981

[51] Int. Cl.³ ............................................. B28B 11/16
[52] U.S. Cl. .................................. 264/40.1; 264/140; 264/144; 264/212; 425/166
[58] Field of Search ...................... 264/212, 40.1, 213, 264/144; 425/115, 140, 150, 132, 142, 161, 164, 163, 325, 337, 372, 166

[56] References Cited

U.S. PATENT DOCUMENTS

| | | | |
|---|---|---|---|
| 2,757,415 | 8/1956 | Mathus et al. | 264/213 |
| 3,081,487 | 3/1963 | Heffner et al. | 425/166 |
| 3,732,193 | 5/1973 | Svarz | 264/300 |
| 3,819,793 | 6/1974 | Elliott | 264/213 |
| 3,836,354 | 9/1974 | Wienert | 264/144 |
| 4,088,727 | 5/1978 | Elliott | 264/300 |
| 4,187,066 | 2/1980 | Hobson et al. | 425/461 |

FOREIGN PATENT DOCUMENTS

| | | | |
|---|---|---|---|
| 51-90354 | 8/1976 | Japan | 264/144 |
| 875140 | 8/1961 | United Kingdom | 264/144 |

*Primary Examiner*—Jay H. Woo
*Attorney, Agent, or Firm*—Wood, Herron & Evans

[57] ABSTRACT

Method and apparatus for preparing a thermosetting resin for further processing. The resin is poured from a batch reactor onto a continuously moving conveyor belt to form a layer of about 2 to 4 inches thick. After the batch is received on the conveyor, the conveyor is stopped for several hours to permit the batch to cool and solidify. Thereafter, the conveyor is restarted and a chopper at the downstream end of the conveyor chops the solidified batch into small chunks and flakes. The conveyor has a rigid trough support under the upstream end of the conveyor's upper run and roller assemblies holding the conveyor in a trough configuration at its downstream end.

4 Claims, 4 Drawing Figures

METHOD FOR PREPARING THERMOSETTING RESINS

This invention relates to the manufacture of a thermosetting resin such as phenolic resin.

In accordance with present practices for making a phenolic resin, several thousand pounds of phenol formaldehyde resin are mixed in a batch reactor with an acid catalyst. If the reaction were permitted to go to completion, the resin would set up into a solid block and thereafter be useless in the manufacture of molded Bakelite parts. Therefore, prior to completion of the reaction, the resin is poured onto a floor and workmen quickly spread the resin out into a layer around 2½ inches thick so that the resin can cool as quickly as possible thereby preventing the thermosetting reaction from going to completion. After about four hours, the resin solidified. The workmen thereafter use sheer manual force to break up the solid chunk of resin. The smaller chunks are then shoveled into a crusher where it is chopped into small chunks or flakes. The resin in this form is sold or shipped to the customers.

It is apparent that there are a number of disadvantages to this process of preparing the resin. It is labor intensive and hence very costly. Substantial floor space is required in order to spread the batch of resin during the intermediate cooling step. The job of spreading the resin and thereafter breaking it up into chunks is a dirty job and it is hard to get laborers to perform it. Toxic fumes generated from the hot molten resin are very difficult and expensive to control.

It has therefore been an objective of the present invention to provide a method and apparatus for preparing partially reacted thermosetting resin wherein much of the unpleasant labor is eliminated and wherein the need for substantial floor space for the process is also reduced.

The objective of the invention is attained by providing an elongated, endless, trough-like conveyor onto which the partially reacted resin can be poured into a thin layer. The conveyor must be of sufficient dimension to contain the entire batch. After the batch is poured, the conveyor is stopped and the batch is permitted to solidify on the conveyor. After the resin is cooled, the conveyor is restarted and the now solid block of resin is conveyed toward a crusher at downstream end of the conveyor which shaves the block into small chunks ready for shipment.

The objectives and features of the invention will become more readily apparent from the following detailed description taken in conjunction with the accompanying drawings in which.

Figure 1:
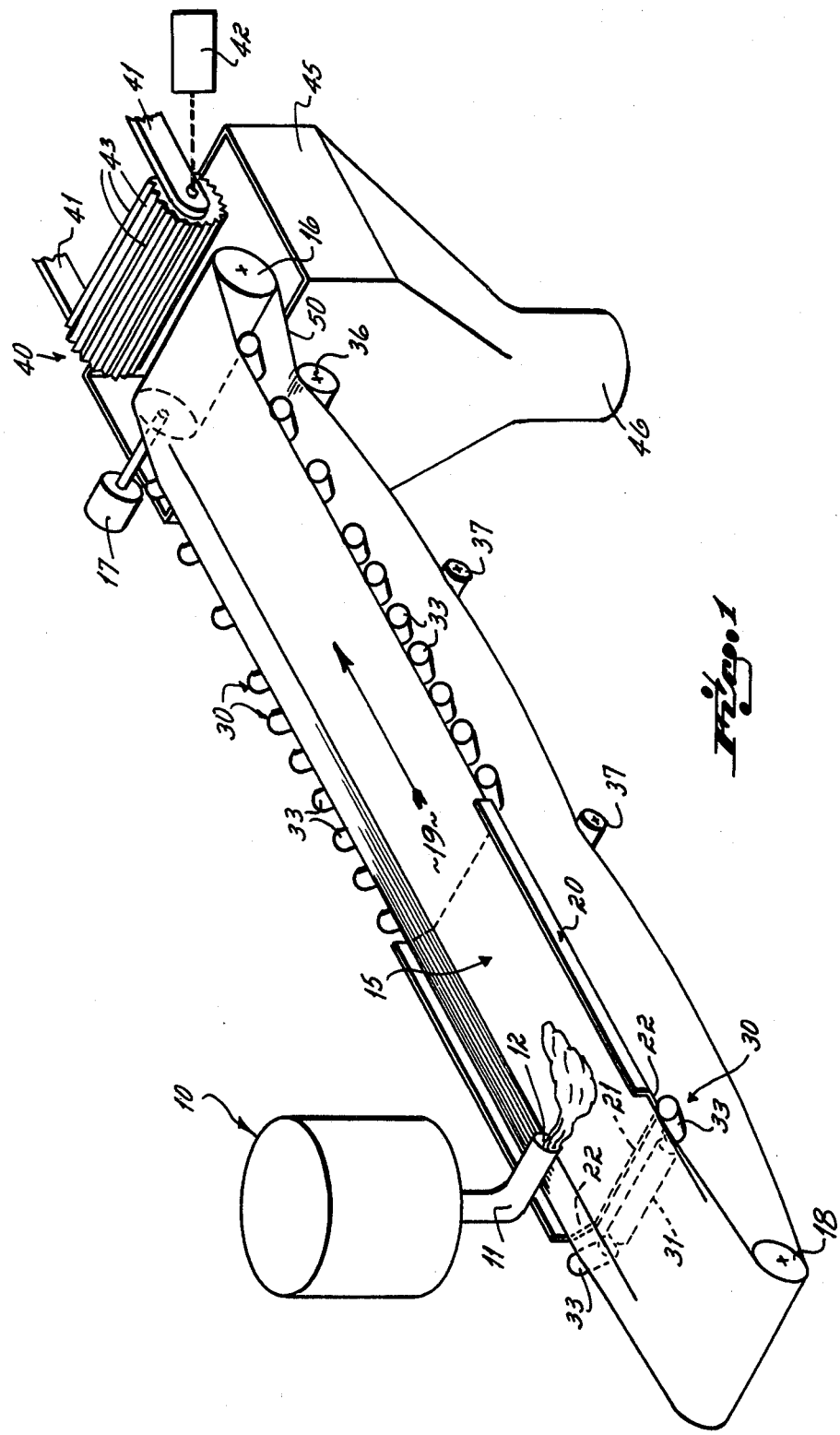
FIG. 1 is a diagrammatic perspective view of the invention.
Figure 2:
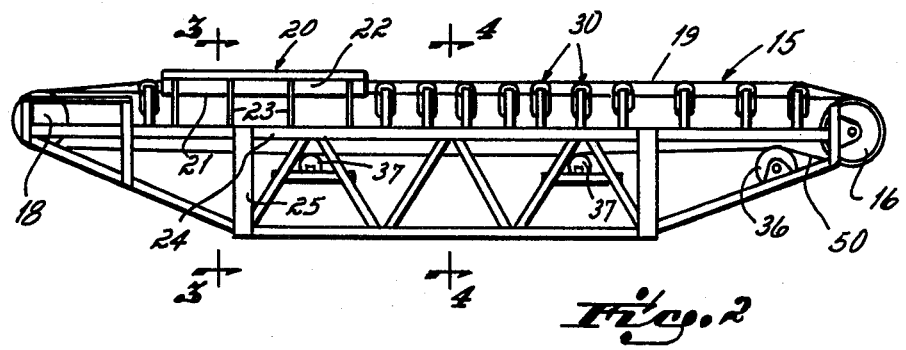
FIG. 2 is a side elevational view of the conveyor portion of the invention.

As shown in FIG. 1, a batch reactor 10 has a capacity of about 1250 gallons and is normally filled to about 70% of its capacity with the resin and catalyst. The reactor has an outlet spout 11 whose discharge end 12 overlies a conveyor belt 15.

The conveyor belt 15 is an endless belt preferably formed of woven polyester fiber coated with a layer of silicone about 1/32 inch thick. The belt is, by way of example, about 5 feet wide and 100-120 feet long. The belt passes around a head pulley 16 which is driven by a motor 17. At the upstream end, it passes around a tail pulley 18.

Figure 3:
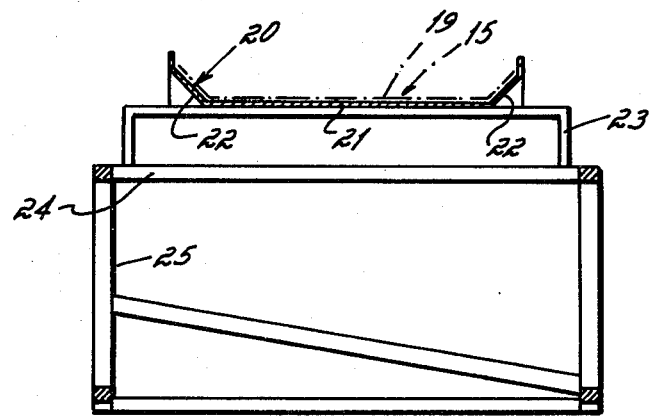
FIG. 3 is a cross-sectional view taken along lines 3—3 of FIG. 1.
Figure 4:
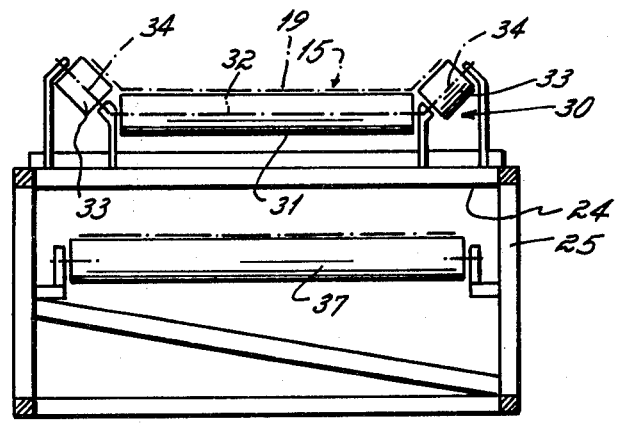
FIG. 4 is a cross-sectional view taken along lines 4—4 of FIG. 1.

The belt has an upper run 19 which, at the upstream end of the belt, passes over a troughing pan 20. The troughing pan, as shown in FIG. 3, has a wide bottom wall 21 and upwardly-inclined side walls 22 to form a trough-like configuration which shapes the belt, as it passes over the tail pulley, into the form of a trough to prevent the fluid resin mass from flowing over the sides of the conveyor belt. The troughing pan is mounted on a series of spaced posts 23 which in turn rest upon an elongated frame 24, the frame being mounted on support structure 25.

Downstream of the troughing pan, the belt passes over a series of longitudinally-spaced idler roller assemblies 30. Each roller assembly includes a central horizontal roller 31 mounted on a horizontal axis 32 and two side rollers 33, each of which is mounted on an inclined axis 34. In the illustrated form of the invention, the axes 34 are inclined at about 45° to horizontal. The roller assemblies provide a low friction support for the belt and are oriented in such a way as to maintain the trough-like configuration of the belt as it moves the full length of the conveyor.

Underneath the conveyor, a snubbing roll 36 is provided to create a tight wrap of the belt around over 180° of the circumference of the head pulley 16. The structure also includes as many return rolls 37 as are required to support the belt against drooping as the lower run of the belt returns to the tail pulley 18.

At the downstream end of the conveyor, a breaker 40 is supported on brackets 41 and is driven by a motor 42. The cake breaker is a roller having a series of teeth 43 which are engageable with the solid cake of resin as it moves off the end of the upper run of the conveyor. Below the breaker is a hopper 45 which funnels the chunks of resin into a conventional crusher 46 where the resin is broken up into fine chunks suitable for shipment.

In the operation of the invention, a batch of resin is prepared in the reactor 10. Before the reaction is completed to a solid mass, the reactor is emptied upon the belt 15. The motor 17 drives the belt 15 at the rate of about 5 or 6 feet per minute so as to permit the reactor to empty in about 20 minutes and fill the belt with a layer about 3 inches thick.

After the reactor has been emptied, the belt should be substantially completely filled with a layer of resin. At this point, the conveyor is stopped to permit the resin to cool and solidify. It may be found desirable to provide cooling fans or other refrigeration means in order to speed the process of the cooling of the resin. It is important that the reactor be emptied quickly and that the cooling process proceed at a reasonably quick rate as is permitted by the thin (3 inch) layer of molten resin so that the thermosetting reaction falls well short of completion. The thickness of the layer can be from 2 to 4 inches as desired, bearing in mind that as the thickness of the molten layer of resin is reduced, the length of the conveyor must be increased in order to receive the complete batch of resin on the conveyor.

After the belt has been filled and the motor stopped, the resin cools for a period of time, for example 4 hours, until it solidifies. After the resin has solidified, the motor 17 is once again started, as is the breaker and crusher.

The conveyor advances the cake into the cake breaker which knocks off chunks of the resin, these chunks falling into the hopper and onto the crusher.

It may be desirable to provide a scraping knife or a series of brushes adjacent the lower run 50 of the conveyor as it passes around the head pulley 16 so as to clean the belt and have it ready for the next batch.

Having described our invention, we claim:

1. The method of preparing a thermosetting resin for subsequent molding operations comprising the steps of, pouring a partially reacted batch of resin onto a continuously moving belt, driving said belt at a lineal speed in relation to the speed of the pour to create a layer of resin on said belt which is approximately 2 to 4 inches thick, the layer being thin enough to permit said resin to cool reasonably rapidly to stop the thermosetting reaction well short of completion, stopping said belt after said complete batch of resin has been poured onto it until said batch has cooled to approximately room temperature, restarting said belt after said batch has cooled and solidified, and chopping said solidified batch into chunks at the downstream end of said conveyor.

2. The method as in claim 1 in which said pouring step is completed in about 20 minutes.

3. The method as in claim 1 further comprising the steps of subjecting said layer of resin to refrigeration to speed the cooling process.

4. The method of preparing a thermosetting phenol formaldehyde resin for subsequent molding operations comprising the steps of, pouring a partially reacted batch of resin onto a continuously moving belt, driving said belt at a lineal speed in relation to the speed of the pour to create a layer of resin on said belt which is aproximately 2 to 4 inches thick, the layer being thin enough to permit said resin to cool reasonably rapidly to stop the thermosetting reaction well short of completion, stopping said belt after said complete batch of resin has been poured onto it until said batch has cooled to aproximately room temperature, restarting said belt after said batch has cooled and solidified, and chopping said solidified batch into chunks at the downstream end of said conveyor.

* * * * *